Aug. 30, 1955
R. H. STIMPSON ET AL
2,716,609
STERILIZING CANNED FOODS
Filed Feb. 19, 1951
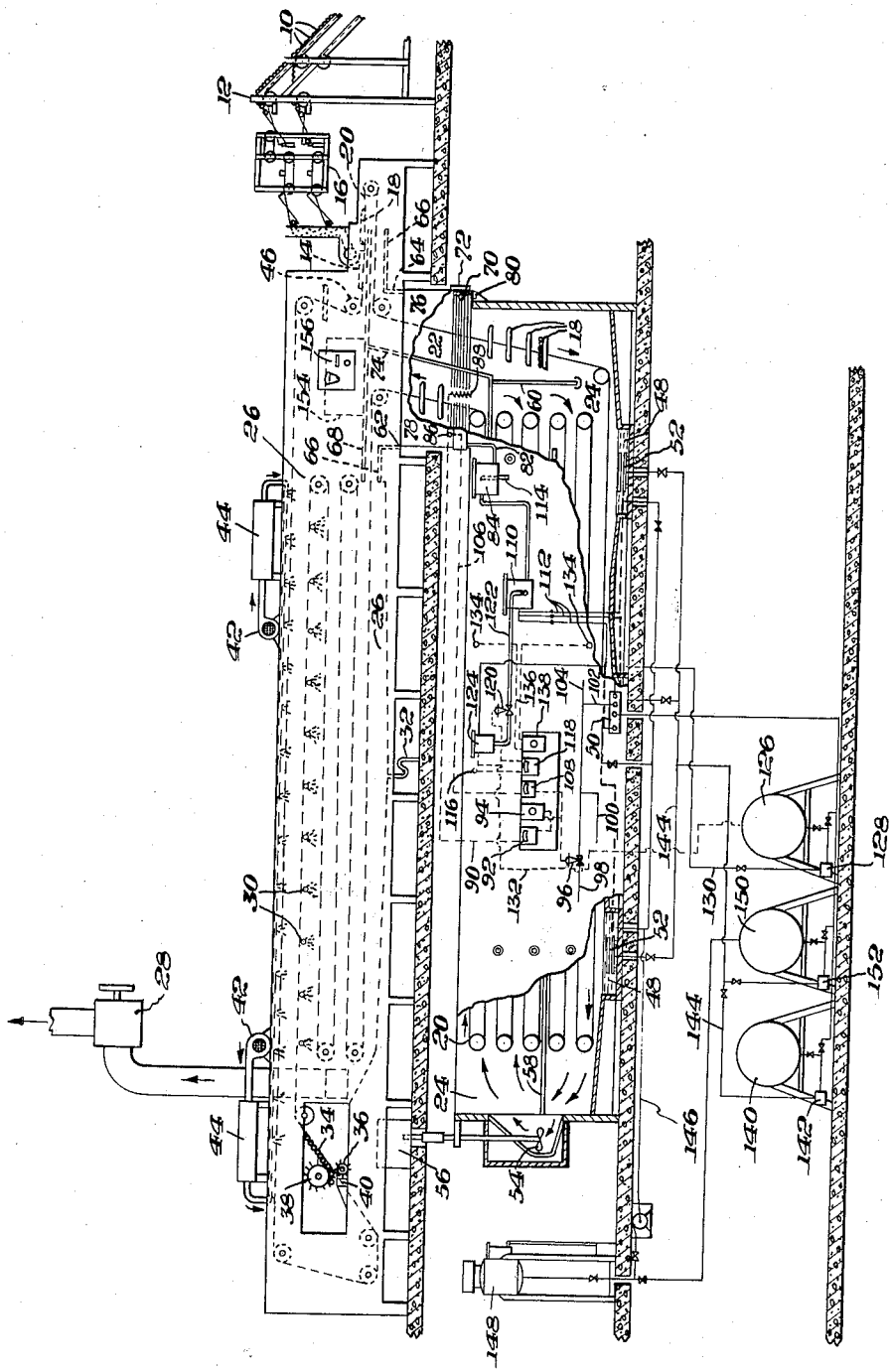
INVENTORS.
ROBERT H. STIMPSON, &
JAMES B. ANDERSON.
BY
Christy, Parmelee and Strickland
their
ATTORNEYS United States Patent Office — 2,716,609 — Patented Aug. 30, 1955

2,716,609

STERILIZING CANNED FOODS

Robert H. Stimpson, Pittsburgh, and James B. Anderson, Mount Lebanon Township, Allegheny County, Pa., assignors to H. J. Heinz Company, Pittsburgh, Pa., a corporation of Pennsylvania Application February 19, 1951, Serial No. 211,612

6 Claims. (Cl. 99—214)

This invention relates to the sterilization of canned foods. More particularly, the invention relates to a continuous method for sterilizing canned foods when using a constant temperature vapor for heating.

Heretofore, food in sealed cans has generally been sterilized in batches or continuously while in autoclaves in which the cans are heated by steam under pressure. This method of sterilization is slow and requires a large amount of expensive equipment and manual labor to handle the cans. Many attempts have been made to sterilize canned foods by heating the cans continuously while passing through a body of a liquid maintained at a desired sterilizing temperature. It has been found, however, that the high boiling liquids used for heating generally have a corrosive action on the cans and special scrubbing operations must be used to remove the heated liquid from the cans. It has been found that sterilization of canned food in a liquid is not practicable because when many thousands of cans on the necessary conveyor are submerged in a liquid heating medium the temperature of the liquid and the cans cannot be held in the narrow temperature range required for sterilization. Also the volume and weight of the heating liquid is very great.

The primary object of the present invention is to provide a continuous method of sterilizing canned foods with vapor within the range of 189°–250° F., at atmospheric pressure.

Another object of the invention is to provide a method of sterilizing canned foods continuously at atmospheric pressure with a vapor having a uniform temperature.

Another object of the invention is to provide a method of sterilizing canned foods continuously at atmospheric pressure with a vapor having a uniform temperature wherein the condensed vapor will not cling to the cans or corrode the cans.

Another object of the invention is to provide a method of sterilizing canned food continuously at atmospheric pressure with the vapor of a liquid mixture which has a desired boiling point, said liquid having good wetting properties and low heat of condensation to provide a high rate of heat transfer to the cans.

A further object of the invention is to provide a method of sterilizing canned food with vapors of a mixture of non-azeotropic liquids by which a series of sterilizing vapor temperatures may be obtained for treating different kinds of foods.

A still further object of the invention is to provide a method of sterilizing canned food with vapor heat and atmospheric pressure in which the heating temperature may be automatically controlled to prevent overheating or incomplete sterilization of the food.

With these and other objects in view, the invention consists in the method of sterilizing canned food as hereinafter described and particularly defined in the appended claims.

In the drawings, a preferred form of apparatus for carrying out the method of the present invention is illustrated in a view in side elevation with parts shown in section.

Broadly considered, the method comprises conveying the canned food through a heating chamber continuously to raise the temperature of the food to a sterilizing and cooking temperature then withdrawing the food from the heating chamber and passing it into a cooling chamber where it is cooled to a temperature of 100° to 105° F. and discharged from the conveyor. Referring to the drawing, cans 10 are handled by an automatic loading mechanism 16 at a loading station 14. The mechanism 12 consists of a series of conveyors which supply the cans to a loading member 16 that places the cans on trays 18 mounted on a conveyor 20. The trays 18 continuously advance under the loader 16 while the cans are being loaded thereon. Each tray is composed of a frame approximately two feet four inches wide and five feet long having bars on which eight rows of cans with approximately twelve cans to a row are loaded depending upon the size of the cans.

The loaded trays are moved by the conveyor 20 from the loading station 14 down through a throat 22 of a heating chamber 24. The conveyor consists of a pair of chains which move in a continuous cyclic path through the heating and cooling chambers and back to the loading station. Each tray has a central pin at each end which is mounted in the chains of the conveyor and a roller is mounted at each corner of the tray which cooperate with guides so that the trays are moved from point to point through the heating and cooling chambers. The trays are held in substantially horizontal position by the guides at the side of the conveyor chains while being heated and cooled.

For the sterilization of canned foods, a considerable time period is required to raise the contents of the can to the sterilizing temperature. It is important that the heating medium shall not be substantially higher in temperature than the sterilizing temperature because some types of food will be injured by an excessive temperature. Most types of food have a low rate of heat transfer so that the foods must remain in the heating chamber for a period of forty to one hundred minutes to be brought to a uniform sterilizing temperature. Accordingly, the heating chamber 24 is an elongated heating chamber from forty to sixty feet in length to allow the conveyor to slowly move back and forth through the heating chamber to give the food a sufficient time interval for being raised to the sterilizing temperature. In the drawing, the conveyor is shown as having ten complete passes in the heating chamber, the conveyor entering the chamber 24 at the bottom thereof and leaving the chamber at the top. As the conveyor leaves the top of the chamber, it passes through the throat 22 and then enters a cooling chamber 26. The cooling chamber is open to the atmosphere and air is drawn across the cans as they advance on the conveyor by means of a fan 28 mounted at the top of the end of the cooling chamber 26. Water is sprayed onto the cans through nozzles 30 which are distributed along the entire length of the conveyor to assist in cooling the cans. The water passes across the cans and passes into a drain 32 positioned in the bottom of the cooling chamber. The volume of the water and the flow of air across the cans is controlled to reduce the temperature of the can and its contents preferably to a temperature of 100–105° F. After the cans are cooled, the conveyor passes through an unloading station 34 where the cans are continuously unloaded as the conveyor passes down inclined guides to the station 34. The unloading is accomplished by a can lifter 36 and a pushing turret 38 which moves the lifted cans to a conveyor 40 by which the cans are carried out of the apparatus. After the cans are unloaded from the trays, the conveyor passes along the ceiling of the cooling chamber 26 and air is introduced by means of fans 42 through heaters 44 to blow warm, dry air onto the conveyor to evaporate any water thereon. After the conveyor passes through the cooling and drying chamber, it passes downwardly around sprockets 46 back to the loading station 14.

The vapor for heating the canned food is derived from either trichloroethylene or perchloroethylene, or a mixture of both. The mixture of liquids composed of predetermined percentages will produce a mixture of vapors at a corresponding temperature. The trichloroethylene has a boiling point of approximately 189° F., while the perchloroethylene has a boiling point of approximately 250° F. Therefore, in accordance with the percentages of the two chlorinated hydrocarbons in the mixture, the vapor temperature may vary throughout the range of 189° to 250° F. For example, with a vapor temperature of 230° F. the liquid being evaporated will be composed of approximately four parts perchloroethylene and one part trichloroethylene.

In the apparatus illustrated in the drawing, the heating of the liquid or liquid mixture is carried out in three sumps 48 which are formed in the bottom of the heating chamber 24. Two sumps are illustrated in the drawing, and the third sump is located immediately behind a cover plate 50. The liquid is evaporated by means of steam coils 52 which are immersed in the liquid, and vapors rise from the evaporating sumps directly up into the chamber in which the canned foods move on the conveyor. The vapors in the heating chamber are circulated in a closed cycle at a high rate of speed by means of a fan 54 which is mounted in one end of the heating chamber and operated by a motor 56. If the vapor of a single chlorinated hydrocarbon is used for heating the canned food, the fan 54 is not required because the natural convection currents resulting from the condensation of the vapor on the cans will be effective in bringing the vapor into contact with the cans to heat them. An important feature of the invention consists in the use of a baffle 58 which is mounted in substantially the central portion of the chamber and extends from wall to wall so that the vapor flows in a stream from the fan through an elongated upper channel to the front end of the chamber, then across baffle 60 at the front end of the chamber and down around the front end of the baffle 58 to return through a lower elongated channel back to the fan 54. By circulating the vapor mixture at a high rate of speed the vapor mixture may be maintained at a uniform temperature so that the cans throughout the cyclic path of the vapors will be subjected to a vapor heating temperature which is substantially uniform. The heating chamber 24 is preferably carefully insulated to minimize the heat losses so that the heating required for sterilizing the foods consists in the heat required to raise the temperature of the can and its food contents to the sterilizing temperature plus the heat radiation losses, and the heat for vaporizing and refluxing any water entering the heating chamber with the conveyor and cans. In accordance with the percentages of either of the chlorinated hydrocarbons or the mixtures of the chlorinated hydrocarbons in the vapor, the heating vapor will have a specific gravity substantially four to six times the specific gravity of air, so that by cooling the vapor in the throat opening 22 at the front end of the heating chamber the vapors can be condensed and returned to the heating sumps without flowing out of the throat, even though it is open to the atmosphere.

When operating with mixed solvents, by carefully insulating the heating chamber, making the cross-sectional area of the vapor stream for heating the canned food as small as practicable, circulating the vapor stream with velocity in excess of 1.25 feet per minute and carefully controlling the volume of vapor passing into the outlet throat to be condensed, the sterilizing and cooking of canned food may be carried out by vaporizing not more than 20% in excess of the volume of vapor required to heat the can and contents to the sterilizing temperature and provide for the radiation losses and the heat for refluxing to remove water. If the velocity of the vapor in the heating stream is maintained at sixty-two feet per minute, there will be practically no temperature drop in the entire circuit of the stream. With a vapor velocity of two feet per minute in the heating stream, a temperature drop of approximately 1° F. may be found at the completion of the vapor circuit. Since the cost of circulating the vapor with a fan is low, a higher velocity of vapor is maintained to gain better control of temperature.

As shown in the drawings, the throat 22 is composed of vertical walls 62 and 64 with horizontal baffles 66 and 68 at the top. The baffles 66 and 68 are separated a sufficient distance to allow one section of the conveyor 20 to pass therethrough, and since ends of the walls 66 and 68 are open to the atmosphere, air may enter into the top of the throat. Cooling coils 70 and a cooling jacket 72 are arranged to surround the lower ends of the vertical walls 62 and 64 to cool the vapors in the throat so that vapors rising up through the throat will be condensed by the time they pass to the top of the coil and cooling jacket. A baffle 74 passes through the throat to divide the throat into an entrance portion 76 and an exit portion 78. Vapor from the heating chamber enters the portion 76 and has a comparatively high temperature so that any water on the conveyor or cans is evaporated as the conveyor and tray pass down through the vapor in the lower part of the entrance portion 76. The solvent and water condensed in the throat collect in a trough 80 at the bottom of coils 70 and this condensate is conducted through a pipe 82 to a water separator 84.

It is very important in the present method of sterilization that the minimum amount of water should be conducted into the heating chamber. If no water enters the heating chamber or throat, the only heat required is for sterilizing the canned foods and that required to heat the can and its contents, plus the thermal losses and the heat required to heat the conveyor. If water does enter the throat section, the baffle and throat arrangement is insulated and formed so that water will be evaporated from the cans and conveyor before the cans and conveyor enter the bottom of the heating chamber 24. The baffles 60 and 74 have an important function of shielding the major portion of the vapor in heating chamber 24 from the cooling effect of the cold conveyor and cans entering the throat portion 76. Evaporation of water and several reevaporations and condensations of the vapor take place in the entrance portion 76.

When the conveyor and sterilized cans leave the top of the heating chamber 24, the conveyor trays enter the outlet section of the throat. The coolers 70 and 72 at the bottom of the throat cool and condense the vapor and prevent the vapors from rising above a preset point.

The outlet section 78 of the throat is used for controlling the level of the heating vapor. To accomplish this, a vapor sensitive coil 88 responds to various levels of vapor in the chamber 78. This coil is connected through a gas filled thermal system 90 to a level controller 92. The impulse given to the controller 92 is transferred to a steam pressure controller 94. The controller 94 is connected with a steam valve 96 which is mounted in the steam supply line 98. As the vapor level changes, the supply of steam changes, this steam being conducted from the valve 96 through lines 100, 102 and 104 to the coils 52 in the sumps 48. As the steam pressure varies, the heating of the liquid or liquid mixture varies to raise or lower the volume of the vapor being generated, and thus the vapor level in the throat 78 may be accurately controlled. A bulb 86 in the throat 78 is a vapor level safety control. This bulb is connected by a vapor filled thermal system 106 with a steam pressure controller 108. If the vapor level rises to a height to surround the bulb 86, the controller will act to close the steam valve 96 in order to reduce the vaporization of liquid in the sumps 48.

In the operation of the sterilizer the heating load may change, due to a temporary stop of the conveyor, or a failure to load the trays full of cans, or a change in the size of cans and the like. The steam pressure controller will act to bring the vapor level to a fixed or preset point on the vapor coil 88 when the vapor level rises or falls with reference to the preset point.

When the sterilized cans pass up through the throat 78, they are coated with a film of the chlorinated hydrocarbon. This condensed chlorinated hydrocarbon has a low viscosity and good wetting properties, so that when the cans come into contact with the air above the vapor level in the throat 78, the film on the cans will readily be absorbed by the air. This air which holds the absorbed vapors then flows into contact with the cooled walls of the throat to condense and collect the condensed vapors so that it can flow down through the trough 80 to pass into the separator 84. Therefore, as the conveyor and cans pass out of the throat 78, all of the hydrocarbon vapor is removed from the cans so that they are in proper condition to be cooled, and no further treatment of the cans is required to remove a coating or film from the cans. This is an important feature of the invention, in that the film of the heating medium is removed continuously from the cans as they leave the heating zone.

The solvent heating medium which is condensed in the throat and collected in the separator 84 overflows from the separator into a distribution tank 110 from which the solvent is distributed in equal proportions into pipes 112 to be returned by the pipes to the vaporizing sumps 48. Water rises to the top of the liquid in the separator 84 and is removed by means of an overflow pipe 114 mounted in the separator with its outlet above the outlet pipe for the hydrocarbon liquid.

As explained above, it is important to maintain a predetermined vapor temperature in the heating chamber so that the cans will not be overheated or underheated. To accomplish this when using a vapor mixture, a temperature bulb 116 is positioned in the upper portion of the vapor channel which is connected by mercury thermal system with a temperature sensitive controller 118. If the temperature tends to vary from the predetermined setting for operation, the controller will operate a valve 120 in a line 122 connected with an overflow tank 124. If the temperature tends to rise, the low boiling trichloroethylene will flow through a line 122 as the valve 120 is opened to add trichloroethylene to the mixture in the tank 110, and this trichloroethylene will then be distributed through the lines 112 to the sumps 48. Trichloroethylene is constantly being supplied to the constant level tank 124 from a storage tank 126 by means of a pump 128. The pump forces the liquid through a line 130 into the tank 124, and any excess liquid entering the tank will be removed through an overflow line 132.

To check on the control of the vapor temperature by the instrument 118, mercury filled thermal systems 134 are placed in the vapor channels which are connected through lines 136 with a temperature recorder 138.

Perchloroethylene is held in a storage tank 140 and may be pumped by a pump 142 through a line 144 to the vaporizing sumps 48 to make up for operating lossess. Perchloroethylene being the high boiling constituent is only introduced into the sumps when it is necessary to change the liquid mixture which is being evaporated or to make up losses. The conveyor chain is lubricated continuously, and it has been found that this lubricant will be washed out of the bearings and find its way into the sumps 48. Therefore, at intervals of once in two weeks or a month, the liquid in the sumps is withdrawn and pumped through a line 146 to a still 148 where it is distilled to separate the solvent from high boiling constituents that are present in the mixture. The distillate from the stills is then returned to a solvent tank 150. The clarified solvent mixture may be taken from the tank 150 by a pump 152 and passed into the line 144 to fill the sumps for continued operation. If the percentages of trichloroethylene and perchloroethylene of the mixture in the tank 150 is not proper for producing the desired vapor heating temperature, the automatic instruments will correct the mixture as the operation continues.

It has been found that the chlorinated hydrocarbons trichloroethylene and perchloroethylene are both stable when being repeatedly evaporated at the temperatures used in the heating operation. This is very advantageous because if the chlorinated hydrocarbons were decomposed in the vaporization it would be very difficult to maintain a constant vapor temperature for controlling the heating of the canned foods and for avoiding corrosion effect of the decomposition products. It has been found furthermore that the boiling temperatures of the chlorinated hydrocarbons will cover the temperature range required for the sterilization of most canned foods and, therefore, any desired temperature may be obtained in the range of 189° to 250° F. for carrying out the sterilization operation.

The latent heat of vaporization of the mixture of chlorinated hydrocarbons may vary from 90 to 105 B. t. u's. per pound. This is a comparatively low latent heat of vaporization and permits the ready vaporization of the chlorinated hydrocarbons by steam in the sumps for maintaining a uniform volume of vapor in circulation in the vapor circuit. The vapor circuit when using mixed vapors is carefully designed to confine as much as possible the cross-sectional area of the vapor stream so that the vapor used in sterillizing will be circulated at a high velocity. This high velocity circulation of the vapors, together with the low viscosity of the chlorinated hydrocarbons which vary from 0.55 to 0.90 centipoises at 20° C. is very effective in a transfer of heat from the vapor to the canned foods. The heat is imparted to the cans due to the latent heat of condensation of the vapors, and with the low viscosity the condensate will readily flow off the cans as it is being condensed to facilitate the heat transfer. The vapor stream passes concurrently and counter-currently to the movement of the cans on the conveyors which assist in actively mixing the vapors to hold the vapors at a constant temperature while it is being forced at a high velocity along the vapor stream.

The specific gravity of the vapor mixture used in the heating chamber will vary from four to six times the specific gravity of air which is very advantageous for forming a vapor-air interface or blanket in the throat 78 to permit the transfer of cans from the vapor zone into the air without the loss of vapor. This heavy vapor is readily condensed by the cooling medium in the throat so that the vapor which is carried out of the heating chamber by the movement of the conveyor is readily condensed and returned to the heating sumps. Furthermore, the condensed solvent cooled in the throat is a good medium for separating the water which tends to go into the heating chamber with the cans and conveyor. Water acts as a temperature depressant in the heating chamber which is very undesirable.

The conveyor 20 is driven by a motor 154 located in the front end of the cooling chamber 26. The speed of the motor may be controlled from a panel 156.

This application is a continuation-in-part of our application Serial No. 695,474, filed September 7, 1946 for Preparation of Canned Foods, now abandoned.

The preferred form of the invention having thus been described, what is claimed as new is:

1. A method of sterilizing and cooking food products in closed containers comprising continuously conveying the containers through a chamber having a top opening at one end thereof for ingress and egress of the containers, continuously vaporizing a liquid non-azeotropic mixture of trichloroethylene and perchloroethylene within the chamber at a rate to maintain a constant volume of vapors within the chamber at atmospheric pressure and of a specific gravity from four to six times that of air, circulating the vapors in a closed circuit within the chamber at a velocity sufficient to maintain the vapors at a uniform temperature while completing the circuit of the chamber, automatically and selectively supplying one of the hydrocarbons to the liquid mixture being evaporated for maintaining the mixed vapors at a preselected temperature, heating the containers and contents by condensing the circulating vapors in contact with the containers for a period sufficient to raise the food to the desired temperature within a range of 189° to 250° F. for sterilizing and cooking the food, then cooling the containers emerging from the chamber to arrest the cooking of the contents.

2. A method of sterilizing and cooking food products in closed containers comprising continuously conveying the containers through a chamber having a restricted throated top opening at one end thereof for ingress and egress of the containers, continuously vaporizing a liquid mixture of trichloroethylene and perchloroethylene within the chamber at a rate to maintain a constant volume of vapors within the chamber at atmospheric pressure and of a specific gravity from four to six times that of air, circulating the vapors in a closed circuit within the chamber at a velocity sufficient to maintain the vapors at a uniform temperature while completing the circuit of the chamber, heating the containers and contents by condensing the circulating vapors in contact with the containers for a period sufficient to raise the food to the desired temperature within a range of 189° to 250° F. for sterilizing and cooking the food, maintaining a vapor-air interface between the exterior and interior of the chamber at the egress portion of the opening of the chamber where the emerging containers meet the atmospheric air, then cooling the containers emerging from the chamber to arrest the cooking of the contents.

3. A method of sterilizing and cooking food products in closed containers comprising continuously conveying the containers through a chamber having a top opening at one end thereof for ingress and egress of the containers, continuously vaporizing a liquid mixture of trichloroethylene and perchloroethylene within the chamber at a rate to maintain a constant volume of vapors within the chamber at atmospheric pressure and of a specific gravity from four to six times that of air, circulating the vapors in a closed circuit within the chamber at a velocity sufficient to maintain the vapors at a uniform temperature while completing the circuit of the chamber, heating the containers and contents by condensing the circulating vapors in contact with the containers for a period sufficient to raise the food to the desired temperature within a range of 189° to 250° F. for sterilizing and cooking the food, providing a restricted zone of convected air circulation to absorb the film of condensed hydrocarbons on the outside of the emerging containers, then cooling the containers emerging from the chamber to arrest the cooking of the contents.

4. A method of sterilizing and cooking food products in closed containers comprising, providing a closed chamber having an opening at the top at one end thereof, continuously passing containers through the chamber by means of the opening, continuously vaporizing a liquid mixture of trichloroethylene and perchloroethylene within the chamber at a rate to maintain a constant volume of vapors within the chamber at atmospheric pressure and of a specific gravity from four to six times that of air, circulating the vapors in a closed circuit within the chamber at a velocity sufficient to maintain the vapors at a uniform temperature while completing the circuit of the chamber, heating the containers and contents by condensing the circulating vapors in contact with the containers for a period sufficient to raise the food to the desired temperature within a range of 189° to 250° F. for sterilizing and cooking the food, vaporizing moisture entering the chamber with the containers by the vapors of the chamber, condensing such vapors passing out of the chamber, separating the condensate water from the hydrocarbon fluids and returning the water free hydrocarbon condensate to the chamber vaporizing station.

5. A method of sterilizing and cooking food products in closed containers comprising providing a chamber having an opening at one end thereof providing ingress and egress of the containers to the chamber, continuously vaporizing a liquid mixture of trichloroethylene and perchloroethylene within the chamber at a rate to maintain a constant volume of vapors within the chamber at atmospheric pressure and of a specific gravity from four to six times that of air, circulating the vapors in a closed circuit within the chamber at a velocity sufficient to maintain the vapors at a uniform temperature while completing the circuit of the chamber, shielding the entering containers from the main body of vapors to restrict fractionation of the chamber vapors to the shielded entrance while preheating the entering containers, heating the containers and contents by condensing the circulating vapors in contact with the containers for a period sufficient to raise the food to the desired temperature within a range of 189° to 250° F. for sterilizing and cooking the food, then cooling the containers emerging from the chamber to arrest the cooking of the contents.

6. The method defined in claim 5 in which moisture associated with the incoming conveyor and containers is evaporated in the shielded entrance for the containers and the water vapors are condensed after vaporization in conjunction with hydrocarbon vapors, the condensed water is separated from the condensed hydrocarbons, and the condensed hydrocarbons are returned to the bottom of the heating chamber.

References Cited in the file of this patent

UNITED STATES PATENTS

| | | |
|---|---|---|
| 2,144,334 | Kennedy | Jan. 17, 1939 |
| 2,322,693 | Kennedy | June 22, 1943 |
| 2,472,970 | Hanna | June 14, 1949 |
| 2,503,193 | Cessna | Apr. 4, 1950 |